US009873835B2

United States Patent
Saito

(10) Patent No.: US 9,873,835 B2
(45) Date of Patent: Jan. 23, 2018

(54) METHOD FOR MANUFACTURING LIQUID CRYSTAL POLYESTER AND LIQUID CRYSTAL POLYESTER

(75) Inventor: Shintaro Saito, Tsukuba (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 35 days.

(21) Appl. No.: 13/556,992

(22) Filed: Jul. 24, 2012

(65) Prior Publication Data

US 2013/0030143 A1    Jan. 31, 2013

(30) Foreign Application Priority Data

Jul. 29, 2011  (JP) .................................. 2011-166325
Sep. 7, 2011   (JP) .................................. 2011-194819

(51) Int. Cl.
C08G 63/87 (2006.01)
C09K 19/38 (2006.01)
C08G 63/60 (2006.01)
C08G 63/80 (2006.01)

(52) U.S. Cl.
CPC ........ C09K 19/3809 (2013.01); C08G 63/605 (2013.01); C08G 63/80 (2013.01); C08G 63/87 (2013.01)

(58) Field of Classification Search
CPC ...... C08G 63/605; C08G 63/87; C08G 63/80; C08G 63/60; C09K 19/3809; C08K 5/524; C08K 19/38; C08L 67/03
USPC ................................................. 528/274, 302
See application file for complete search history.

(56) References Cited

U.S. PATENT DOCUMENTS

| | | | |
|---|---|---|---|
| 4,522,974 | A | 6/1985 | Calundann et al. |
| 4,889,911 | A | 12/1989 | Pielartzik et al. |
| 6,528,164 | B1 | 3/2003 | Ohbe et al. |
| 6,838,018 | B2 * | 1/2005 | Okamoto et al. ........ 252/299.01 |
| 2002/0055607 | A1 | 5/2002 | Okamoto et al. |
| 2003/0127628 | A1 | 7/2003 | Kanaka et al. |
| 2004/0044171 | A1 | 3/2004 | Okamoto et al. |
| 2004/0164282 | A1 | 8/2004 | Okamoto et al. |

FOREIGN PATENT DOCUMENTS

| | | |
|---|---|---|
| JP | H05-005025 A | 1/1993 |
| JP | 2001-72750 A | 3/2001 |
| JP | 2002-146003 A | 5/2002 |
| JP | 2003-055446 A | 2/2003 |
| JP | 2003-183373 A | 7/2003 |
| JP | 2008-088322 A | 4/2008 |
| TW | 200605097 A | 2/2006 |

OTHER PUBLICATIONS

Gerhard Hofle et al "4-Dialkylaminopyridines as Highly Active Acylation Catalysts", Angew. Chem. Int.Ed.Engl. 17. 569-583 1978.*
Naoyuki Koide, "Liquid Crystalline Polymer—Synthesis Molding Applications," Sumitomo Chemical Co., Ltd., Tsukuba Research Laboratory, Jun. 5, 1987.
Office Action issued in Chinese Application No. 201210260812.0 dated May 4, 2015.
Office Action issued in Taiwan Patent Application No. 101126750 dated Oct. 7, 2015 with its English translation.
Second Office Action for Chinese Patent Application No. 201210260812.0 dated Dec. 22, 2015.
Japanese Office Action issued in application No. 2012-165755 dated Jun. 28, 2016 with an English translation.
Notice of Reasons for Rejection issued in Japanese Patent Application No. 2012-165755 dated Dec. 6, 2016.
Taiwanese Office Action issued in application No. 101126750 dated Feb. 15, 2016 with an English translation.

* cited by examiner

*Primary Examiner* — Ling Choi
*Assistant Examiner* — Gennadiy Mesh
(74) *Attorney, Agent, or Firm* — Foley & Lardner LLP

(57) ABSTRACT

A method for manufacturing a liquid crystal polyester, comprising: a melt polycondensation step in which 0.001 to 1% by mass of a heterocyclic aromatic compound represented by the following formula (I) is added to a monomer mixture comprising at least one monomer selected from the group consisting of terephthalic acid, a terephthalic acid derivative, 2,6-naphthalenedicarboxylic acid and a 2,6-naphthalenedicarboxylic acid derivative, relative to 100% by mass of the monomer mixture, and then a melt polycondensation is conducted at a temperature of 240 to 300° C. so as to obtain a polymer.

[Chemical Formula 1]

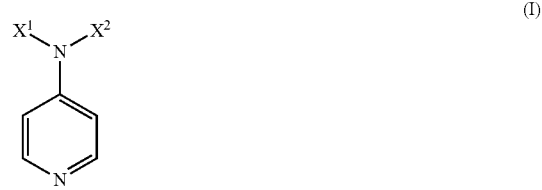

(I)

(wherein each of $X^1$ and $X^2$ independently represents a methyl group, an ethyl group, a propyl group, a butyl group or a pentyl group, provided that one or more hydrogen atoms on a heterocyclic aromatic ring may each independently be replaced by a halogen atom, an alkyl group or an aryl group).

5 Claims, No Drawings

METHOD FOR MANUFACTURING LIQUID CRYSTAL POLYESTER AND LIQUID CRYSTAL POLYESTER

TECHNICAL FIELD

The present invention relates to a method for manufacturing a liquid crystal polyester and relates to a liquid crystal polyester.

Priority is claimed on Japanese Patent Application No. 2011-166325, filed Jul. 29, 2011 and Japanese Patent Application No. 2011-194819, filed Sep. 7, 2011, the content of which is incorporated herein by reference.

BACKGROUND ART

A liquid crystal polyester resin which exhibits crystallinity while melting is used for various applications and various fields, since it has excellent heat resistance and workability. A liquid crystal polyester can be obtained, for example, by polycondensation of an aromatic hydroxy carboxylic acid, an aromatic diol, an aromatic dicarboxylic acid and derivatives such as an ester compound thereof, which are monomers corresponding to repeating units.

In the polycondensation reaction, in the case of using a compound having a phenolic hydroxyl group as a reaction group, such as a hydroxy carboxylic acid and an aromatic diol, the reactivity is low, and it is difficult for the reaction conversion rate to rise. Therefore, in the case that such compounds are used as a starting material (raw material), a production method in which, in order to increase the reactivity, phenolic hydroxyl groups of these compounds are reacted with fatty acid anhydrides to acylate phenolic hydroxyl groups of these compounds, and then polycondensation of acylated compounds is conducted, has been known. In addition, in order to shorten the reaction time, a reaction conducted in the presence of a catalyst has been explored (see, for example, Patent Documents 1 and 2).

In addition, in order to increase the molecular weight of the liquid crystal polyester, in the case that a polymer is exposed to a high-temperature environment for a long period of time, it is easy for thermal degradation thereof to proceed. For this problem, in a method described in Patent Document 3, polycondensation is conducted in a reaction vessel in a short period of time at first, and then the resulting polymer is pulled out in melting condition while it can be easily pulled out from the reaction vessel, followed by solidification and crush thereof, and then solid phase reaction is conducted to increase the molecular weight of the resulting polymer up to a desired molecular weight. Thus, increasing the molecular weight and improving the productivity of a liquid crystal polyester can be achieved while reducing the thermal history.

CITATION LIST

Patent Documents

[Patent Document 1] Japanese Unexamined Patent Application, First Publication No. 2003-183373
[Patent Document 2] Japanese Unexamined Patent Application, First Publication No. 2002-146003
[Patent Document 3] Japanese Unexamined Patent Application, First Publication No. 2001-72750

SUMMARY OF INVENTION

Technical Problem

In order to improve the heat resistance of the liquid crystal polyester, as a monomer which is used for the aforementioned polycondensation reaction, dicarboxylic acids such as terephthalic acid, terephthalic acid derivatives (sometimes hereinafter referred to as "terephthalic acids") and 2,6-naphthalenedicarboxylic acid and 2,6-naphthalenedicarboxylic acid derivatives (hereinafter, sometimes referred to as "2,6-naphthalenedicarboxylic acids") may be used to form a polymer structure having a substantially linear shape and a rigid structure after polymerization. These monomers can increase heat resistance of the obtainable polymer from these monomers. On the other hand, in polymerization reaction, a high temperature is required, since the reactivity in polymerization of these monomers is low.

On the other hand, so as to produce a high-quality liquid crystal polyester in which color degradation has been suppressed, it is necessary to reduce the thermal history in order to suppress the progression of thermal degradation. In order to reduce the thermal history, it is necessary to conduct polymerization in a short period of time. However, in the case of using monomers having low reactivity, such as terephthalic acids and 2,6-naphthalenedicarboxylic acids, the melt polycondensation at a temperature higher than 300° C. in the aforementioned method in which a catalyst is used, there is a problem of color degradation of the obtainable polymer.

In addition, in the case that a polymerization method with which solid-phase polymerization is combined is adopted as described above, when polymerization is conducted in a short period of time and at a low temperature, there is a problem that polymers adhere to each other during solid phase polymerization, and thereby tend to be difficult to handle.

The present invention has been made in view of such circumstances, and has an object to provide a method for manufacturing a liquid crystal polyester, in which the melt polycondensation reaction using terephthalic acids and 2,6-naphthalenedicarboxylic acids can proceed in a short period of time and at a low temperature. In addition, the present invention has another object to provide a liquid crystal polyester obtained by using such a method for manufacturing.

Means of Solving the Problems

In order to solve the above problems, the present invention has the following embodiments.

First embodiment of the present invention is a method for manufacturing a liquid crystal polyester, including: a melt polycondensation step in which 0.001 to 1% by mass of a heterocyclic aromatic compound represented by the following formula (I) is added to a monomer mixture comprising at least one of monomer selected from the group consisting of terephthalic acid, a terephthalic acid derivative, 2,6-naphthalenedicarboxylic acid and a 2,6-naphthalenedicarboxylic acid derivative, relative to 100% by mass of the monomer mixture, and then a melt polycondensation is conducted at a temperature of 240 to 300° C. so as to obtain a polymer.

[Chemical Formula 1]

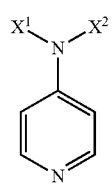

(I)

(wherein each of $X^1$ and $X^2$ independently represents a methyl group, an ethyl group, a propyl group, a butyl group or a pentyl group, provided that one or more hydrogen atoms on a heterocyclic aromatic ring may each independently be replaced by a halogen atom, an alkyl group or an aryl group).

In the present invention, the method for manufacturing a liquid crystal polyester preferably further includes: a cooling step that the polymer obtained by the melt polycondensation step is pulled out from a reacting vessel and cooled; the milling step to mill the polymer which is solidified in the cooling step; and a solid phase polymerization step that the polymer which is milled in the milling step is heated so as to increase the degree of polymerization by a solid phase polymerization higher than that of the polymer before the solid phase polymerization.

In the present invention, the monomer mixture preferably includes a compound represented by the following general formula (1'), a compound represented by the following general formula (2') and a compound represented by the following general formula (3').

$$G^1\text{-O---Ar}^1\text{---CO-G}^2 \tag{1'}$$

$$G^2\text{-CO---Ar}^2\text{---CO-G}^2 \tag{2'}$$

$$G^1\text{-X---Ar}^3\text{---Y-G}^1 \tag{3'}$$

(wherein, $Ar^1$ represents a phenylene group, a naphthylene group or a biphenylylene group; each of $Ar^2$ and $Ar^3$ independently represents a phenylene group, a naphthylene group, a biphenylylene group or a group represented by the following general formula (4); each of X and Y independently represents an oxygen atom or an imino group; each $G^1$ independently represents a hydrogen atom or an alkylcarbonyl group; and each of $G^2$ independently represents a hydroxyl group, an alkoxy group, an aryloxy group, an alkylcarbonyloxy group or a halogen atom, provided that one or more hydrogen atoms in $Ar^1$, $Ar^2$ and $Ar^3$ may each independently be replaced by a halogen atom, an alkyl group or an aryl group).

$$-\text{Ar}^4\text{---Z---Ar}^5- \tag{4}$$

(wherein, each of $Ar^4$ and $Ar^v$ independently represents a phenylene group or a naphthylene group; and Z represents an oxygen atom, a sulfur atom, a carbonyl group, a sulfonyl group or an alkylidene group).

In the present invention, the method for manufacturing a liquid crystal polyester preferably further comprises an acylation step in which the monomer mixture includes a compound having a phenolic hydroxyl group, and the phenolic hydroxyl group is acylated before the melt polycondensation step.

In the present invention, in the acylation step, it is desirable that 1.00 to 1.15 equivalent of an acid anhydride is reacted with the phenolic hydroxyl group to acylate the those group.

In the present invention, acetic anhydride is preferably used as the acid anhydride.

The liquid crystal polyester of a second embodiment of the present invention is a polymer obtained by the method for manufacturing a liquid crystal polyester of the first embodiment.

Effect of the Invention

According to the present invention, even if the polymerization using terephthalic acids and 2,6-naphthalenedicarboxylic acids is conducted to provide a liquid crystal polyester, it is possible to proceed the reaction at a low temperature and in a short period of time. In addition, by virtue of using the manufacturing method, it is possible to provide a liquid crystal polyester in which coloration is suppressed.

DETAILED DESCRIPTION OF THE INVENTION

<Method for Manufacturing Liquid Crystal Polyester>

A method for manufacturing a liquid crystal polyester of the first embodiment of the present invention includes a melt polycondensation step in which 0.001 to 1% by mass of a heterocyclic aromatic compound represented by the following formula (I) is added to a monomer mixture including at least one monomer selected from the group consisting of terephthalic acid, a terephthalic acid derivative, 2,6-naphthalenedicarboxylic acid and a 2,6-naphthalenedicarboxylic acid derivative, relative to 100% by mass of the monomer mixture, and then a melt polycondensation is conducted at a temperature of 240 to 300° C. so as to obtain a polymer.

[Chemical Formula 2]

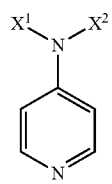

(I)

(wherein each of $X^1$ and $X^2$ independently represents a methyl group, an ethyl group, a propyl group, a butyl group or a pentyl group, provided that one or more hydrogen atoms on a heterocyclic aromatic ring may each independently be replaced by a halogen atom, an alkyl group or an aryl group).

The liquid crystal polyester of a second embodiment of the present invention is a polymer obtained by the method for manufacturing a liquid crystal polyester of the first embodiment.

Hereinafter, the present invention is described in detail.

A typical example of the liquid crystal polyester (hereinafter, sometimes referred to as "polymer") provided by the method for manufacturing a liquid crystal polyester of the first embodiment of the present invention includes a polymer which can be obtained by polymerization (i.e., polycondensation) between at least one monomer selected from the group consisting of terephthalic acid, a terephthalic acid derivative, 2,6-naphthalenedicarboxylic acid and a 2,6-naphthalenedicarboxylic acid derivative, and at least one compound selected from the group consisting of an aromatic hydroxy carboxylic acid and an aromatic diol. In addition, if necessary, an aromatic dicarboxylic acid other than terephthalic acids and 2,6-naphthalenedicarboxylic acids may also be used in polycondensation.

Here, as aromatic hydroxycarboxylic acids; an aromatic dicarboxylic acid other than a terephthalic acids and 2,6-naphthalenedicarboxylic acids; and an aromatic diol, each of polymerizable derivative thereof may independently be used in place of part or all of their compounds.

As terephthalic acid derivatives, 2,6-naphthalenedicarboxylic acid derivatives, and aromatic dicarboxylic acid derivatives other than terephthalic acids and 2,6-derivatives of aromatic dicarboxylic acids, examples include a compound in which a carboxyl group is converted into an alcoxycarbonyl group or an aryloxycarbonyl group (i.e., ester group), a compound in which a carboxyl group is converted into a haloformyl group (i.e., acid halide) and a compound in which a carboxyl group is converted into an acyloxycarbonyl group (i.e., acid anhydride).

Here, an alkoxycarbonyl group is a monovalent group in which an alkoxy group is bonded to a carbonyl group. As the alkoxy group, the same group listed below as an alkoxy group for $G^2$ can be used. Specific examples include a methoxycarbonyl group, an ethoxycarbonyl group and the like.

An aryloxycarbonyl group is a monovalent group in which an aryloxy group is bonded to a carbonyl group. As the aryloxy group, the same group listed below as an aryloxy group for $G^2$ can be used. Specific examples include a phenoxycarbonyl group and the like.

A haloformyl group is a monovalent group in which a halogen atom is bonded to a carbonyl group. As the halogen atom, the same group listed below as a halogen atom for $G^2$ can be used. Specific examples include a chloroformyl group, a bromoformyl group, a iodoformyl group, and the like.

An acyloxycarbonyl group is a monovalent group in which an acyl group is bonded to an oxygen atom in an oxycarbonyl group (—O—(C=O)—). An acyl group is a monovalent group in which an alkyl group or an aryl group is bonded to a carbonyl group. Specific examples include a acetyl group, a benzoyl group and the like. Specific examples of the acyloxycarbonyl group include an acetyloxycarbonyl group, a benzoylcarbonyl group, and the like.

As terephthalic acid derivatives, a compound represented by the general formula (2') can be mentioned. Specific examples include terephthaloyl dichloride, terephthaloyl dibromide, a mixed acid anhydride of terephthalic acid and acetic acid, and the like.

As a 2,6-naphthalenedicarboxylic acids, a compound represented by the general formula (2') can be mentioned. Specific examples include 2,6-naphthalenedicarbonyl dichloride, 2,6-naphthalenedicarbonyl dibromide, a mixed acid anhydride of 2,6-naphthalenedicarboxylic acid and acetic acid, and the like.

Examples of polymerizable derivatives of their compounds having a hydroxyl group (i.e., phenolic hydroxyl group), such as an aromatic hydroxycarboxylic acid and an aromatic dial include a derivative in which a phenolic hydroxyl group is converted into an acyloxy group by acylation (i.e., an acylated compound).

An acyloxy group is a monovalent group in which the acyl group is bonded to an oxygen atom. Specific examples include a acetyloxy group, a benzoyloxy group and the like.

[Melt Polycondensation Step]

According to this embodiment, in the melt polycondensation step, a mixture containing the following monomer (i.e., monomer mixture) is heated and stirred to conduct polycondensation while melting the monomer mixture (i.e., melt polycondensation).

(Monomer)

In the melt polycondensation reaction, a polymerization using a monomer represented by the following general formula (1') (hereinafter sometimes referred to as "monomer (1')") to prepare a liquid crystal polyester is preferable, a polymerization using a monomer (1'), a monomer represented by the following general formula (2') (hereinafter sometimes referred to as "monomer (2')") and a monomer represented by the following general formula (3') (hereinafter sometimes referred to as "monomer (3')") to prepare a liquid crystal polyester is more preferable.

$$G^1\text{-O}—Ar^1—CO\text{-}G^2 \quad (1')$$

$$G^2\text{-CO}—Ar^2—CO\text{-}G^2 \quad (2')$$

$$G^1\text{-X}—Ar^3—Y\text{-}G^1 \quad (3')$$

(wherein, $Ar^1$ represents a phenylene group, a naphthylene group or a biphenylylene group; each of $Ar^2$ and $Ar^3$ independently represents a phenylene group, a naphthylene group, a biphenylylene group or a group represented by the following general formula (4); each of X and Y independently represents an oxygen atom or an imino group; each of $G^1$ independently represents a hydrogen atom or an alkylcarbonyl group; each of $G^2$ independently represents a hydrogen atom, an alkoxy group, an aryloxy group, an alkylcarbonyloxy group or a halogen atom, provided that one or more hydrogen atoms in $Ar^1$, $Ar^2$ and $Ar^3$ may each independently be replaced by a halogen atom, an alkyl group or an aryl group).

$$—Ar^4—Z—Ar^5— \quad (4)$$

(wherein, each of $Ar^4$ and $Ar^5$ independently represents a phenylene group or a naphthylene group; Z represents an oxygen atom, a sulfur atom, a carbonyl group, a sulfonyl group or an alkylidene group).

As a phenylene group for $Ar^1$, $Ar^2$ and $Ar^3$, o-phenylene group, m-phenylene group and p-phenylene group can be mentioned.

As a naphtylene group or $Ar^1$, $Ar^2$ and $Ar^3$, 1,8-naphtylene group, 1,4-naphtylene group, 2,6-naphtylene group and the like can be mentioned.

In addition, as a biphenylylene group for $Ar^1$, $Ar^2$ and $Ar^3$, 2,2'-biphenylylene group, 4,4'-biphenylylene group and the like can be mentioned.

As a halogen atom by which one or more hydrogen atoms in $Ar^1$, $Ar^2$ and $Ar^3$ is replaced, a fluorine atom, a chlorine atom, a bromine atom and a iodine atom can be mentioned.

As an alkyl group by which one or more hydrogen atom in $Ar^1$, $Ar^2$ and $Ar^3$ is replaced, an alkyl group having 1 to 10 carbon atoms is preferred. Specific examples include a methyl group, an ethyl group, an n-propyl group, an isopropyl group, an n-butyl group, an isobutyl group, a sec-butyl group, a tert-butyl group, an n-pentyl group, an n-hexyl group, an n-heptyl group, a 2-ethylhexyl group, an n-octyl group, an n-nonyl group, an n-decyl group and the like.

As an aryl group by which one or more hydrogen atoms in $Ar^1$, $Ar^2$ and $Ar^3$ is replaced, an aryl group having 6 to 10 carbon atoms is preferred. Specific examples include a phenyl group, an o-tolyl group, an m-tolyl group, a p-tolyl group, a 1-naphthyl group, and a 2-naphthyl group.

In the case that the hydrogen atoms are replaced by these groups, the number thereof is preferably two or less, and the number is more preferably one, per each group represented by $Ar^1$, $Ar^2$ or $Ar^3$. In the case that there are multiple substituent groups, each substituent group may be the same or different.

As an alkylidene group for Z in the general formula (4), an alkylidene group having 1 to 10 carbon atoms is preferred. Specific examples include a methylene group, an ethylidene group, an n-propylidene group, an isopropylidene group, an n-butylidene group, an n-pentylidene group, an n-hexylidene group, an n-heptylidene group, an n-octylidene group, a 2-ethylhexylidene group, an n-nonylidene group and an n-decylidene group.

Each of $G^1$ independently represents a hydrogen atom or an alkylcarbonyl group. The alkylcarbonyl group is a monovalent group in which the alkyl group is bonded to a carbonyl group (—C(=O)—). As the alkyl group, the same group as the alkyl group by which a hydrogen atom is replaced can be mentioned. Specific examples include a methylcarbonyl group (i.e., acetyl group), an ethylcarbonyl group and the like.

Two of $G^1$ in the general formula (3') may be the same or different from each other. In addition, $G^1$ in the general formula (1') and $G^1$ in the general formula (3') may be the same or different from each other.

Each of $G^2$ independently represents a hydroxyl group, an alkoxy group, an aryloxy group, an alkylcarbonyloxy group or a halogen atom.

The alkoxy group for $G^2$ is a monovalent group in which an alkyl group is bonded to an oxygen atom (—O—). As the alkyl group, the same group as the alkyl group by which a hydrogen atom is replaced can be mentioned. Specific examples include a methoxy group, an ethoxy group and the like.

As the aryloxy group for $G^2$ is a monovalent group in which an aryl group is bonded to an oxygen atom (—O—). As the aryl group, the same group as the aryl group by which a hydrogen atom is replaced can be mentioned. Specific examples include a phenoxyl group and the like.

The alkylcarbonyloxy group for $G^2$ is a monovalent group in which an alkyl group is bonded to a carbon atom of a carbonyloxy group (—C(=O)—O—). As the alkyl group, the same group as the alkyl group by which a hydrogen atom is replaced can be mentioned. Specific examples include a methycarbonyloxy group, an ethylcarbonyloxy group and the like.

As the halogen atom for $G^2$, a chlorine atom, a bromine atom and a iodine atom can be mentioned.

Two of $G^2$ in the general formula (2') in the melt polycondensation reaction may be the same or different from each other. In addition, $G^2$ in the general formula (1') and $G^2$ in the general formula (2') may be the same or different from each other.

The used amount of the monomer (1') in the melt polycondensation reaction is preferably 30 mol % or more, more preferably 30 to 80 mol %, further preferably 40 to 70 mol %, and particularly preferably 45 to 65 mol %, relative to the total used amount of the monomer (1'), the monomer (2') and the monomer (3').

The used amount of the monomer (2') in the melt polycondensation reaction is preferably 35 mol % or less, more preferably 10 to 35 mol %, further preferably 15 to 30 mol %, and particularly preferably 17.5 to 27.5 mol %, relative to the total used amount of the monomer (1'), the monomer (2') and the monomer (3').

The used amount of the monomer (3') is preferably 35 mol % or less, more preferably 10 to 35 mol %, further preferably 15 to 30 mol %, and particularly preferably 17.5 to 27.5 mol %, relative to the total used amount of the monomer (1'), the monomer (2') and the monomer (3').

Each used amount of the monomer (2') and the monomer (3') is preferably substantially equal.

That is, the ratio between the monomer (2') and the monomer (3') is preferably 0.9/1 to 1/0.9, more preferably 0.95/1 to 1/0.95, and further preferably 0.98/1 to 1/0.98, which is represented by [the used amount of the monomer (2')]/[the used amount of the monomer (3')].

In the melt polycondensation reaction, two or more types of each monomers (1') to (3') can be independently used. In addition, another monomer which does not belong to the monomer (1') to (3') can be used. The used amount thereof is preferably 10 mol % or less, and more preferably 5 mol % or less, relative to the total used amount of the monomers which is used in the melt polycondensation reaction.

[Acylation Step]

Here, in the case that the monomer used in the reaction is a compound having a phenolic hydroxyl group, the reactivity is low so that it is difficult for the conversion ratio in the polycondensation to rise.

Therefore, in the case that the monomer used has a phenolic hydroxyl group, that is, in the case that $G^1$ is a hydrogen atom in the general formula (1') or in the case that X is an oxygen atom and $G^1$ is a hydrogen atom in the general formula (3'), in order to increase the reactivity, phenolic hydroxyl groups of these compounds are preferably reacted with fatty acid anhydrides to acylate phenolic hydroxyl groups of these compounds.

As the fatty acid anhydride, as long as it has the effect of the present invention, it is not particularly limited. Examples include acetic anhydride, propionic anhydride, butyric anhydride, isobutyric anhydride, valeric anhydride, pivalic anhydride, 2-ethylhexanoic anhydride, monochloroacetic anhydride, dichloroacetic anhydride, trichloroacetic anhydride, monobromoacetic anhydride, dibromoacetic anhydride, tribromoacetic anhydride, monofluoroacetic anhydride, difluoroacetic anhydride, trifluoroacetic anhydride, glutaric anhydride, maleic anhydride, succinic anhydride, β-bromopropionic anhydride and the like.

These fatty acid anhydrides may be used in a mixture of two or more. In terms of price and handling, acetic anhydride, propionic anhydride, butyric anhydride and isobutyric anhydride are preferably used. Among them, acetic anhydride is more preferably used.

The used amount of the fatty acid anhydride in the acylation, 1.0 to 1.15 equivalent is preferable, and 1.03 to 1.10 equivalent is more preferable, relative to the amount of the phenolic hydroxyl group in a monomer.

In the case that the used amount of the fatty acid anhydride is less than 1.0 equivalent relative to the amount of the phenolic hydroxyl group, the conversion rate in the polycondensation is less likely to rise, because unreacted phenolic hydroxyl groups remain. In addition, unreacted aromatic diols, unreacted aromatic hydroxycarboxylic acids and unreacted aromatic dicarboxylic acid are sublimed during polymerization to prepare a liquid crystal polyester, and are likely to obstruct the inner of the pipe arranged in the reaction vessel.

Further, in the case that the used amount of the fatty acid anhydride is greater than 1.15 equivalent, the obtainable liquid crystal polyester tends to be significantly colored.

Acylation reaction in the acylation step is preferably conducted at a temperature of 130 to 180° C. for 30 minutes to 20 hours, and more preferably conducted at a temperature of 140 to 160° C. for 1 hours to 5 hours.

Such a reaction may be conducted in an reaction vessel other than the reaction vessel to perform polycondensation reaction, or it may be conducted in the same reaction vessel as the reaction vessel to perform polycondensation reaction and then the polycondensation reaction may be subsequently conducted. The acylation reaction and the polycondensation reaction being conducted in the same reaction vessel is preferable because the operation becomes simple.

As a reaction vessel for acylation reaction, a reaction vessel composed of a material having a corrosion resistant, such as titanium and Hastelloy B can be used. Also, in the case that the desired liquid crystal polyester is needed to have a high tone (L value), the material of the inner wall of the reaction vessel is preferably glass. If the inner wall of the reaction vessel which contacts with the reaction mixture is made of glass, it is not necessary that the entire reaction vessel be made of glass. For example, it is also possible to use a reaction vessel made of SUS on which glass lining is conducted. For example, in large production facilities, a reaction vessel on which glass lining is conducted is preferably used.

[Type of Monomer and Polymerization Catalyst]

In a liquid crystal polyester obtained by polymerization, the physical properties thereof are changed in dependent on the type of monomer used in polymerization. Therefore, the type of monomer can be suitably selected as necessary.

As a monomer (2'), if at least one monomer selected from the group consisting of terephthalic acid, terephthalic acid derivatives, 2,6-naphthalenedicarboxylic acid and 2,6-naphthalenedicarboxylic acid derivatives is used in 5 mol % or more, relative to the total amount of monomers used, heat resistance of the liquid crystal polyester obtained by the polymerization.

That is, in the method for manufacturing a liquid crystal polyester of the present embodiment, at least one type of monomer represented by the following general formula (A') (hereinafter, sometimes refer to as "monomer (A')") is used as a monomer (2').

$$G^2\text{-CO}\text{—}Ar^2\text{—}CO\text{-}G^2 \quad (A')$$

(wherein, $Ar^2$ represents a p-phenylene group or a 2,6-naphthylene group; each of $G^2$ independently represents a hydroxyl group, an alkoxy group, an aryloxy group, an alkylcarbonyloxy group or a halogen atom, provided that one or more hydrogen atoms in $Ar^2$ may each independently be replaced by a halogen atom, an alkyl group or an aryl group).

It is noted that as a monomer (A'), a monomer in which $Ar^2$ represents an unsubstituted p-phenylene group and each $G^2$ represents a hydroxyl group is "terephthalic acid" in the present invention, and other monomers are "terephthalic acid derivatives" in the present invention.

It is noted that as a monomer (A'), a monomer in which $Ar^2$ represents an unsubstituted 2,6-naphthylene group and each $G^2$ represents a hydroxyl group is "2,6-naphthalenedicarboxylic acid" in the present invention, and other monomers are "2,6-naphthalenedicarboxylic acid derivatives" in the present invention.

That is, one type of the monomer represented by the general formula (A') is "at least one monomer selected from the group consisting of terephthalic acid, terephthalic acid derivatives, 2,6-naphthalenedicarboxylic acid and 2,6-naphthalenedicarboxylic acid derivatives."

A halogen atom, an alkyl group or an aryl group in $Ar^2$, and an alkoxy group, an aryloxy group, an alkylcarbonyloxy group or a halogen atom for $G^2$ in the monomer (A') are the same groups as the groups in $Ar^2$ in the monomer (2'), and the number of these substituent groups in the monomer (A') is the same number as the number of the substituent groups in $Ar^2$ in the monomer (2').

These monomers (A') can improve heat resistance of the liquid crystal polyester obtained by polymerization. However the reactivity thereof is low, and it is difficult to proceed the melt polycondensation. Even when using the monomer (A') having low reactivity, the reaction can be conducted at a high polymerization temperature in the melt polycondensation. However, since the thermal history of the obtained liquid crystal polyester is increased, color deterioration (coloration) is caused.

Therefore, in the method for manufacturing a liquid crystal polyester of the present embodiment, a catalytic amount of an aromatic heterocyclic compound represented by the following formula (I) (hereinafter, sometimes referred to as a compound (I)) is added so as to promote the reaction, and thereby the melt polycondensation is conducted.

[Chemical Formula 3]

(I)

(wherein each of $X^1$ and $X^2$ independently represents a methyl group, an ethyl group, a propyl group, a butyl group or a pentyl group, provided that one or more hydrogen atoms in the heterocyclic aromatic ring may each independently be replaced by a halogen atom, an alkyl group or an aryl group).

As $X^1$ and $X^2$, a methyl group and an ethyl group are preferred.

As a halogen atom by which one or more hydrogen atoms in the aromatic heterocyclic group is replaced, a fluorine atom, a chlorine atom, a bromine atom and a iodine atom can be mentioned.

As an alkyl group by which one or more hydrogen atoms in the aromatic heterocyclic group is replaced, an alkyl group having 1 to 10 carbon atoms is preferred. Specific examples include a methyl group, an ethyl group, an n-propyl group, an isopropyl group, an n-butyl group, an isobutyl group, a sec-butyl group, a tert-butyl group, an n-pentyl group, an n-hexyl group, an n-heptyl group, a 2-ethylhexyl group, an n-octyl group, an n-nonyl group, an n-decyl group and the like. Among these, an alkyl group having 1 to 4 carbon atoms is preferred.

As an aryl group by which one or more hydrogen atom in the aromatic heterocyclic group is replaced, an alkyl group having 6 to 20 carbon atoms are preferred. Specific examples include a phenyl group, an o-tolyl group, an m-tolyl group, a p-tolyl group, a 1-naphthyl group and a 2-naphthyl group.

The used amount of the compound (I) is preferably 0.001 to 1 parts by mass, relative to the amount of the monomer mixture used in the melt polycondensation. The lower limit of the used amount of the compound (I) is more preferably 0.002 parts by mass or more. The upper limit of the used amount of the compound (I) is more preferably 0.8 parts by mass or less. That is, 0.002 to 0.8 parts by mass is more preferable.

When the used amount of the compound (I) is less than 0.001 parts by mass, the effect of promoting the reaction obtained by addition of the compound (I) becomes small. In addition, when the used amount of the compound (I) is greater than 1 parts by mass, coloration of the obtained liquid crystal polyester may occur and the reaction rate of the melt polycondensation is too fast to control the polymerization.

The melt polycondensation may be conducted in the presence of other catalysts in addition to the compounds of (I). Examples of catalysts that can be used in combination include metal compounds such as magnesium acetate, stannous acetate, tetrabutyl titanate, lead acetate, sodium acetate, potassium acetate, antimony trioxide and the like; and nitrogen-containing heterocyclic compounds such as 1-methylimidazole and the like.

The used amount of the other catalyst is preferably 0.1 parts by mass or less, relative to 100 parts by mass of the amount of the monomer mixture.

The temperature in the polycondensation reaction of the first embodiment of the present invention is preferably 240 to 300° C. The lower limit of the polymerization temperature is preferably 250° C. or more. The upper limit of the polymerization temperature is preferably 290° C. or less. When the polymerization temperature is less than 240° C., the polycondensation reaction does not proceed. In addition, when the polymerization temperature is greater than 300° C., for example, when the temperature is increased to 320° C., the polymerization reaction excessively proceeds, and thereby the resulting polymer is solidified in the reaction vessel. Therefore, it is difficult to pull the polymer out from the reaction vessel.

The time for the polycondensation reaction can be appropriately set in terms of suppressing reduction in the productivity, after the reaction condition, such as a temperature condition and the amount of the catalyst is selected in order to control the reaction. For example, 30 minutes to 5 hours at the aforementioned temperature is preferred.

More specifically, it is preferable that the reaction temperature is 250 to 300° C., the used amount of the catalyst is 0.003 to 0.05 parts by mass, relative to 100 parts by mass of the amount of the monomer mixture, and the reaction time is 20 to 200 minutes.

In addition, the larger used amount of the monomer (1') becomes, the more melt fluidity, heat resistance, strength and rigidity of the obtained liquid crystal polyester are improved. If the amount is too large, a melting temperature of the obtained liquid crystal polyester tends to become high, and a temperature required for molding tends to become high.

A polycondensation reaction in the present embodiment can be conducted under an inert gas such as a nitrogen atmosphere, and under the conditions of ordinary pressure or reduced pressure. For example, a polycondensation reaction is preferably conducted under ordinary pressure and under an inert gas atmosphere. As a process, a batch type, a continuous type or a combination of those can be employed.

In the polycondensation reaction, as the shape of the reaction vessel, a conventionally known shape can be used. As a stirring blade, in the case of using a vertical reaction vessel, a multi-stage paddle blade, a turbine blade, a monte blade, or a double helical blade are preferred. Among these, a multi-stage paddle blade and a turbine blade are more preferable. In the case of using a horizontal reaction vessel, blades having various shapes, for example, a lens blade, a glass blade, a multi-circle flat plate blade are preferably disposed perpendicular to a agitation shaft having one or two shafts are preferred. Further, a stirring blade twisted in order to improve stirring performance and feed mechanism is also preferred.

Heating of the reaction vessel is conducted using a heat medium, gas or an electric heater. In terms of uniform heating, heating not only the reaction vessel but also parts, such as an agitation shaft, a blade and a baffle plate which are immersed in the reaction material in the reaction vessel is preferred.

[Solid Phase Polymerization Step]

A liquid crystal polyester obtained by the melt polycondensation may also be polymerized by the heat treatment if necessary, in order to increase the molecular weight. A polymer after the melt polycondensation is solidified by cooling, depending on the degree of polymerization. Therefore, after cooling the polymer to provide a solidified polymer in a cooling step, milling the solidified polymer using a known milling device in a milling step, and heating the resulting powder in a solid phase polymerization step, and thereby solid phase polymerization is preferably conducted.

If the molecular weight is increased up to the desired molecular weight in the melt polycondensation step, it is likely to become difficult to pull the polymer out from the reaction vessel after the polymerization. However, as noted above, in the case of increasing the molecular weight up to the desired molecular weight in solid phase polymerization after increasing the molecular weight up to the level that the resulting polymer can be pulled out from the reaction vessel in the melt polycondensation, operation of polymerization becomes easy and manufacturing a desired liquid crystal polyester becomes easy. Therefore, a liquid crystal polyester having a high molecular weight, excellent heat resistance, excellent strength and excellent stiffness can be easily obtained.

The solid phase polymerization is preferably conducted by heating the resin while maintaining the constant temperature range. As a temperature condition in the solid phase polymerization is preferably 220 to 300° C., and more preferably 230 to 290° C.

The polymerization time in the solid phase polymerization is preferably 3 hours or more, and in terms of suppressing reduction of the productivity, is preferably 20 hours or less.

The flow beginning temperature of the liquid crystal polyester has a correlation with the degree of polymerization of the liquid crystal polyester. Thus, the flow beginning temperature of the liquid crystal polyester is measured after the melt polycondensation, and solid phase polymerization may be conducted under inert gas atmosphere, until the flow beginning temperature is increased to the level corresponding to the desired degree of polymerization.

Here, the flow beginning temperature which is called as the flow temperature, refers to the temperature at which the melt viscosity indicates 4800 Pa·s (48000 poise) when the liquid crystal polyester is extruded from a nozzle having an inner diameter of 1 mm and a length of 10 mm, after melting the liquid crystal polyester while increasing the temperature at a temperature-increase rate of 4° C./min under a load of 9.8 MPa (100 kgf/cm$^2$) using a capillary-type rheometer (refer to, for example, "Synthesis, Molding, and Application of Liquid Crystal Polymer," by Naoyuki Koide, pages 95 to 105, CMC, published on Jun. 5, 1987). The temperature is an index of the molecular weight of the liquid crystal polyester.

It is possible to obtain a desired liquid crystal polyester in the manner described above.

<Structure of Liquid Crystal Polyester>

The liquid crystal polyester of the present embodiment obtained as described above contains a repeating unit represented by the following formula (A) (hereinafter, sometimes referred to as "repeating unit (A)").

$$—CO—Ar^2—CO— \quad (A)$$

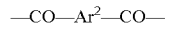

(wherein, Ar$^2$ represents a p-phenylene group or a 2,6-naphthylene group, provided that one or more hydrogen atoms in $Ar^2$ may each independently be replaced by a halogen atom, an alkyl group or an aryl group).

The halogen atom, alkyl group or aryl group in $Ar^2$, and the alkoxy group, aryloxy group, alkylcarbonyloxy group or halogen atom in $G^2$ in the repeating unit (A) are the same groups as the groups in $Ar^2$ in the monomer (A'), and the number of these substituent groups in the repeating unit (A) is the same as the number of the substituent groups in $Ar^2$ in the monomer (A').

When 5 mol % or more of the repeating unit (A) is included in a liquid crystal polyester, the effect of improving the heat resistance can be achieved.

In addition, the liquid crystal polyester of the present embodiment preferably contains a repeating unit represented by the following general formula (1) (hereinafter, sometimes referred to as "repeating unit (1)"), and more preferably contains a repeating unit (1), a repeating unit represented by the following general formula (2) (hereinafter, sometimes referred to as "repeating unit (2)") and a repeating unit represented by the following general formula (3) (hereinafter, sometimes referred to as "repeating unit (3)"), in addition to the repeating unit (A).

$$-O-Ar^1-CO- \quad (1)$$

$$-CO-Ar^2-CO- \quad (2)$$

$$-X-Ar^3-Y- \quad (3)$$

(wherein, $Ar^1$ represents a phenylene group, a naphthylene group or a biphenylylene group; $Ar^2$ represents a phenylene group, a naphthylene group, a biphenylylene group or a group represented by the following general formula (4); $Ar^3$ represents a phenylene group, a naphthylene group, a biphenylylene group or a group represented by the following general formula (4); each of X and Y independently represent an oxygen atom or an imino group, provided that one or more hydrogen atoms in $Ar^1$, $Ar^2$ and $Ar^3$ may each independently be replaced by a halogen atom, an alkyl group or an aryl group).

$$-Ar^4-Z-Ar^5- \quad (4)$$

(wherein, each of $Ar^4$ and $Ar^6$ independently represents a phenylene group and a naphthylene group; Z represents an oxygen atom, a sulfur atom, a carbonyl group, a sulfonyl group or an alkylidene group).

The halogen atom, alkyl group or aryl group as a substituent group in the general formulas (1) to (3) are the same groups as the halogen atom, alkyl group or aryl group as a substituent group in the general formulas (1') to (3'), and the number of these substituent groups in the general formulas (1) to (3) is the same as the number of the substituent groups in the general formulas (1') to (3').

The repeating unit (1) is a repeating unit derived from a predetermined aromatic hydroxycarboxylic acid. As a repeating unit (1), a repeating unit in which $Ar^1$ is a p-phenylene group (i.e., a repeating unit derived from p-hydroxybenzoic acid) and a repeating unit in which $Ar^1$ is a 2,6-naphthylene group (i.e., a repeating unit derived from 6-hydroxy-2-naphthoic acid) are preferred. That is, as a monomer (1'), a monomer in which $Ar^1$ is a p-phenylene group or a 2,6-naphthylene group is preferably used.

The repeating unit (2) is a repeating unit derived from a predetermined aromatic dicarboxylic acid. As a repeating unit (2), a repeating unit in which $Ar^2$ is a p-phenylene group (i.e., a repeating unit derived from terephthalic acid) and a repeating unit in which $Ar^2$ is a 2,6-naphthylene group (i.e., a repeating unit derived from 2,6-naphthalenedicarboxylic acid) can be mentioned. When 5 mol % or more of these repeating units are contained, relating to the total amount of all repeating units constituting the polymer, heat resistance of the resin is preferably improved.

Also, as a repeating unit (2), a repeating unit in which $Ar^2$ is a m-phenylene group (i.e., a repeating unit derived from isophthalic acid) and a repeating unit in which $Ar^2$ is a diphenylether-4,4'-diyl group (i.e., a repeating unit derived from diphenylether-4,4'-dicarboxylic acid) are preferred. That is, as a monomer (2), a monomer in which $Ar^2$ is an m-phenylene group or a diphenylether-4,4'-diyl group is preferably used.

The repeating unit (3) is a repeating unit derived from a predetermined aromatic diol, aromatic hydroxylamine or aromatic diamine. As a repeating unit (3), a repeating unit in which $A^3$ is a p-phenylene group (i.e., a repeating unit derived from hydroquinone, p-aminophenol or p-phenylenediamine) and a repeating unit in which $Ar^3$ is a 4,4'-biphyenylylene group (i.e., a repeating unit derived from 4,4'-dihydroxybiphenyl, 4-amino-4'-hydroxybiphenyl or 4,4'-diaminobiphenyl) are preferred. That is, as the monomer (3'), a monomer in which $Ar^3$ is a p-phenylene group or a 4,4'-biphenylylene group is preferably used.

In the case of using a monomer having an amino group, which composes a repeating unit (3), the reaction with a monomer (A) is easy to proceed due to high reactivity of the amino group with a carboxyl group. However, even when using such monomers, the effect of promoting the reaction obtained by the aforementioned compound (I) used as a catalyst can be achieved.

In addition, in terms of suppressing coloration, the total amount of the repeating unit having a naphthylene skeleton among the repeating units (1) to (3) is preferably 30 mol % or less, more preferably 25 mol % or less, and further preferably 20 mol % or less, relative to the total amount of all the repeating units.

A naphthylene skeleton tends to have an absorption band in the visible light region. Thus, if the amount of the naphthylene skeleton included in the liquid crystal polyesters falls in the above range, it is possible to suppress the coloration. The smaller amount of the naphthylene skeleton is, the better. Also, the naphthylene skeleton may not be included in the polymer.

In addition, the liquid crystal polyester obtained by the method described above may be melted and granulated. As the form of granulation, pellet is preferred.

As a method for producing pellets by granulating particles of the liquid crystal polyester, a method in which melt-kneading is conducted using a generally-used uniaxial or a biaxial extruder, and after air-cooled or water-cooled if necessary, pellets are provided using a pelletizer (strand cutter), can be mentioned. The generally-used extruder can be used for the purpose of uniform melting and forming a shape. In terms of uniform melting, it is preferable to use an extruder having a large L/D. In the melt-kneading, the preset temperature of a cylinder disposed in an extruder (i.e., die head temperature) is preferably 200 to 450° C.

In addition, to the liquid crystal polyester manufactured by the production method of the present embodiment, an inorganic filler may be added if necessary. Examples of the inorganic filler include calcium carbonate, talc, clay, silica, magnesium carbonate, barium sulfate, titanium oxide, alumina, montmorillonite, gypsum, glass flakes, glass fibers, carbon fibers, alumina fibers, silica alumina fibers, aluminum borate whisker, potassium titanate fiber and the like.

These inorganic fillers can be used within a range such that the transparency and mechanical strength of the film are not impaired.

In addition, to the liquid crystal polyester manufactured by the production method of the present embodiment, a variety of additives such as an organic filler, an antioxidant, a heat stabilizer, a light stabilizer, a flame retardant, a lubricant, an antistatic agent, an inorganic or organic colorant, a rust inhibitor, a crosslinking agent, a foaming agent, a fluorescent agent, a surface smoothing agent, a surface gloss improving agent or a mold release agent such as a fluorine resin can be added during the manufacturing process or subsequent processing step.

The coloration of the aforementioned liquid crystal polyester is suppressed. Thus, by molding the liquid crystal polyester, it is possible to obtain a molded product having excellent color tone.

In particular, by molding a liquid crystal polyester containing a white pigment, it is possible to obtain a high reflectance reflector. In this case, as a method of molding, injection molding method is preferred. According to the injection molding method, a reflector having a thin portion and a reflector having a complex shape can be easily obtained. In particular, in order to obtain a small reflector having a thickness at the thin portion of 0.01 to 3.0 mm, preferably 0.02 to 2.0 mm, and more preferably 0.05 to 1.0 mm, injection molding method is suitable.

The resin having a high degree of whiteness of the present invention is preferably used as a raw material for reflective parts for reflecting light, in particular, for reflecting visible light in the field of electricity, electron, automobile, machinery, and the like. For example, it is suitably used as a lamp reflector in a light source device, such as a halogen lamp or an HID, and as a reflector in a light-emitting device and display device in which a light-emitting element, such as an LED or an organic EL is used. In particular, it is suitably used as a reflector in the light emitting device in which an LED is used.

According to the method for manufacturing a liquid crystal polyester, having above constitution, even if the polymerization using terephthalic acids and 2,6-naphthalenedicarboxylic acids is conducted to provide a liquid crystal polyester, it is possible to proceed the reaction at a low temperature and in a short period of time.

In addition, the coloration of the above liquid crystal polyester can be suppressed.

EXAMPLES

The present invention is described below along with examples, and it should be noted that the present invention is not limited to these examples.

Various physical properties in the Examples and Comparative Examples were measured by the following method.

[Measurement of Flow Beginning Temperature]

The flow beginning temperature of the liquid crystal polyester was measured using a flow tester (manufactured by Shimadzu Corporation, Ltd., type CFT-500). 2 g of the liquid crystal polyester was filled in a cylinder equipped with a die including a nozzle having an inner diameter of 1 mm and a length of 10 mm. The temperature at which the melt viscosity was indicated as 4800 Pa·s (48000 poise) when the liquid crystal polyester was melted and extruded from the nozzle at a temperature-increase rate of 4° C./min under a load of 9.8 MPa (100 kgf/cm$^2$) was used as the flow beginning temperature.

[Coloration of Powder]

The polymer obtained by the melt polycondensation was cooled so as to be solidified and subsequently milled to provide a powder of the solidified polymer. The coloration of the resulting powder of the polymer (i.e., prepolymer) was measured using a colorimeter (ZE-2000, manufactured by Nippon Denshoku Industries Co., Ltd.). Here, in the present specification, the L* value represented by the CIE L*a*b* was adopted as the value of the coloration.

[Adhesion Property of Powder]

After the powder of the prepolymer was fed into an aluminum vessel having a diameter of 5 cm so that the height of the powder became approximately 3 cm. Then, solid phase polymerization was conducted while heating for 10 hours at 260° C., and then a disk-shaped test piece having a diameter of 5 cm and a height of approximately 3 cm was prepared.

A test piece which broke when bent by hand after cooling, was evaluated as "no adhesion occurred". In contrast, a test piece which did not break even when bent by hand after cooling, was evaluated as "adhesion occurred". The test piece evaluated as "no adhesion occurred" was easily broken. On the other hand, the test piece evaluated as "adhesion occurred" powder was tightly solidified and united and it was difficult to bend.

Example 1

994.5 g (7.2 mol) of p-hydroxybenzoic acid, 446.9 g (2.4 mol) of 4,4'-dihydroxybiphenyl, 239.2 g (1.44 mol) of terephthalic acid, 159.5 g (0.96 mol) of isophthalic acid, 1298.6 g (12.7 mol) of acetic anhydride and 0.146 g (1.2 mmol) of 4-dimethylaminopyridine were fed into a reaction vessel equipped with a stirring apparatus, a torque meter, a nitrogen gas introduction pipe, a thermometer, and a reflux condenser. After the inner gas of the reaction vessel was replaced with nitrogen gas, the temperature was increased to 150° C. from room temperature over 30 minutes while stirring under nitrogen gas atmosphere, followed by refluxing at 150° C. for one hour, thereby acylation was conducted.

Then, after 4-dimethylaminopyridine was further added, the temperature was increased over 1 hour and 50 minutes up to 260° C. from 150° C. while distilling off the unreacted acetic anhydride and acetic acid as a byproduct (temperature rising rate: 1° C./min). After incubation for 160 min at 260° C. to conduct the melt polycondensation, an increase of the torque was observed by using a torque meter, the contents were pulled out from the reacting vessel, and then cooled to room temperature.

After cooling, a solidified polymer was obtained. Then, a powder of the prepolymer was obtained by milling the solidified polymer using a milling machine (vertical mill, manufactured by Orient Co., Ltd., using a screen of 2 mm).

The flow beginning temperature, the coloration and the adhesion properties of the obtained powder of the prepolymer were evaluated by the aforementioned method.

Example 2

A powder of the prepolymer was obtained in the same manner as in Example 1, except that after acylation of the monomer in the same manner as in Example 1, 0.730 g (6.0 mmol) of 4-dimethylaminopyridine was further added, and the melt polycondensation was conducted for 40 minutes of the polymerization time.

Example 3

A powder of the prepolymer was obtained in the same manner as in Example 1, except that after acylation of the monomer in the same manner as in Example 1, 1.022 g (8.4 mmol) of 4-dimethylaminopyridine was further added, and the melt polycondensation was conducted for 20 minutes of the polymerization time.

Example 4

A powder of the prepolymer was obtained in the same manner as in Example 1, except that after acylation of the monomer in the same manner as in Example 1, 0.292 g (2.4 mmol) of 4-dimethylaminopyridine was further added, followed by incubation at 270° C. for 110 minutes, and thereby the melt polycondensation was conducted.

Example 5

A powder of the prepolymer was obtained in the same manner as in Example 1, except that after acylation of the monomer in the same manner as in Example 1, 1.022 g (8.4 mmol) of 4-dimethylaminopyridine was further added, followed by incubation at 290° C. for 20 minutes, and thereby the melt polycondensation was conducted.

Example 6

A powder of the prepolymer was obtained in the same manner as in Example 1, except that after acylation of the monomer in the same manner as in Example 1, 0.730 g (6.0 mmol) of 4-dimethylaminopyridine was further added, followed by incubation at 240° C. for 10 minutes, and thereby the melt polycondensation was conducted.

Comparative Example 1

A powder of the prepolymer was obtained in the same manner as in Example 1, except that after acylation was conducted using 0.098 g (1.2 mmol) of N-methylimidazole (NMI) instead of 4-dimethyamonopyridine, 0.492 g (6.0 mmol) of N-methylimidazole was further added, and the melt polycondensation was conducted for 180 minutes of a polymerization time and at 290° C. of a polymerization temperature.

Comparative Example 2

A powder of the prepolymer was obtained in the same manner as in Example 1, except that after acylation was conducted using 0.098 g (1.2 mmol) of N-methylimidazole instead of 4-dimethyamonopyridine, 0.492 g (6.0 mmol) of N-methylimidazole was further added, and the melt polycondensation was conducted for 180 minutes of a polymerization time.

Comparative Example 3

828.6 g (6.0 mol) of p-hydroxybenzoic acid, 558.6 g (3.0 mol) of 4,4'-dihydroxybiphenyl, 498.4 g (3.0 mol) of isophthalic acid, 1298.6 g (12.7 mol) of acetic anhydride and 0.098 g (1.2 mmol) of N-methylimidazole were fed into a reaction vessel equipped with a stirring apparatus, a torque meter, a nitrogen gas introduction pipe, a thermometer, and a reflux condenser. After the inner gas of the reaction vessel was replaced with nitrogen gas, the temperature was increased to 150° C. from room temperature over 30 minutes while stirring under nitrogen gas atmosphere, followed by refluxing at 150° C. for one hour, thereby acylation was conducted.

Then, after 0.492 g (6.0 mmol) of N-methylimidazole was further added, the temperature was increased to 260° C. from 150° C. over 1 hour and 50 minutes while distilling off the unreacted acetic anhydride and acetic acid as a byproduct (temperature rising rate: 1° C./min). After incubation for 180 min at 260° C. to conduct the melt polycondensation, an increase of the torque was observed by using a torque meter, the contents were pulled out from the reacting vessel, and then cooled to room temperature.

After cooling, a solidified polymer was obtained. Then, a powder of the prepolymer was obtained by milling the solidified polymer using a milling machine.

Comparative Example 4

After acylation of the monomer in the same manner as in Example 1, 4-dimethylaminopyridine was further added, and the temperature was increased over 2 hours and 50 minutes to 320° C. from 150° C. while distilling off the unreacted acetic anhydride and acetic acid as a byproduct (temperature rising rate: 1° C./min).

At 320° C., the degree of polymerization was excessively increased, and the resulting polymer was solidified in the reaction vessel. It was difficult to pull the solidified polymer out from the reaction vessel, so the polymerization reaction was stopped.

Comparative Example 5

After acylation of the monomer in the same manner as in Example 1, 4-dimethylaminopyridine was further added, and the temperature was increased over 1 hour and 20 minutes to 230° C. from 150° C. while distilling off the unreacted acetic anhydride and acetic acid as a byproduct (temperature rising rate: 1° C./min). By incubation at 230° C. for 5 hours, the melt polycondensation was conducted. However, a increase of the torque was not observed by using a torque meter disposed in the reaction vessel, and the procession of the polymerization reaction was not observed.

The results of Examples and Comparative Examples are shown in Table 1.

TABLE 1

| | | Example 1 | Example 2 | Example 3 | Example 4 | Example 5 | Example 6 |
|---|---|---|---|---|---|---|---|
| p-hydroxybenzoic acid | molar | 0.60 | 0.60 | 0.60 | 0.60 | 0.60 | 0.60 |
| 4,4'-dihydroxybiphenyl | ratio | 0.20 | 0.20 | 0.20 | 0.20 | 0.20 | 0.20 |
| terephthalic acid | | 0.12 | 0.12 | 0.12 | 0.12 | 0.12 | 0.18 |
| isophthalic acid | | 0.08 | 0.08 | 0.08 | 0.08 | 0.08 | 0.02 |
| acetic anhydride | | 1.05 | 1.05 | 1.05 | 1.05 | 1.05 | 1.10 |
| type of catalyst | | DMAP | DMAP | DMAP | DMAP | DMAP | DMAP |

TABLE 1-continued

| | | | | | | | |
|---|---|---|---|---|---|---|---|
| amount of catalyst | parts by mass | 0.01 | 0.06 | 0.08 | 0.03 | 0.06 | 0.06 |
| temperature of melt polycondensation | °C. | 260 | 260 | 260 | 270 | 290 | 240 |
| time for melt polycondensation | min | 160 | 40 | 20 | 110 | 20 | 10 |
| coloration of prepolymer | L* | 92.2 | 92.7 | 92.0 | 91.7 | 91.2 | 91.9 |
| flow beginning temperature of prepolymer | °C. | 203 | 197 | 202 | 224 | 252 | 217 |
| temperature of solid phase polymerization | °C. | 260 | 260 | 260 | 260 | 260 | 260 |
| adhesion property | | No adhesion occurred | No adhesion occurred | No adhesion occurred | No adhesion occurred | No adhesion occurred | No adhesion occurred |

| | | Comparative Example 1 | Comparative Example 2 | Comparative Example 3 | Comparative Example 4 | Comparative Example 5 |
|---|---|---|---|---|---|---|
| p-hydroxybenzoic acid | molar ratio | 0.60 | 0.60 | 0.50 | 0.60 | 0.60 |
| 4,4'-dihydroxybiphenyl | | 0.20 | 0.20 | 0.25 | 0.20 | 0.20 |
| terephthalic acid | | 0.12 | 0.12 | 0.00 | 0.12 | 0.12 |
| isophthalic acid | | 0.08 | 0.08 | 0.25 | 0.08 | 0.08 |
| acetic anhydride | | 1.05 | 1.05 | 1.05 | 1.05 | 1.05 |
| type of catalyst | | NMI | NMI | NMI | DMAP | DMAP |
| amount of catalyst | parts by mass | 0.06 | 0.06 | 0.06 | 0.06 | 0.06 |
| temperature of melt polycondensation | °C. | 290 | 260 | 260 | 320 | 230 |
| time for melt polycondensation | min | 180 | 180 | 180 | — | — |
| coloration of prepolymer | L* | 90.0 | 92.1 | 91.9 | — | — |
| flow beginning temperature of prepolymer | °C. | 261 | <200 | 233 | — | — |
| temperature of solid phase polymerization | °C. | 260 | 260 | 260 | — | — |
| adhesion property | | No adhesion occurred | Adhesion occurred | No adhesion occurred | — | — |

From the results of the evaluations, in Example 1, the polymerization reaction in the melt polycondensation using terephthalic acid had proceeded, and a good powder of the prepolymer in which color deterioration (coloration) was suppressed was obtained.

Adhesion of the resin was not observed according to the adhesion test.

In Examples 2 and 3, by further adding a catalytic amount of DMAP after the acylation step and before the melt polycondensation, a good powder of the prepolymer was obtained by the melt polycondensation for a short period of time. Adhesion of the resin was not observed according to the adhesion test.

In Examples 4 and 5, by further adding a catalytic amount of DMAP after the acylation step and before the melt polycondensation, a good powder of the prepolymer was obtained by the melt polycondensation at each of the polycondensation temperature.

Adhesion of the resin was not observed according to the adhesion test.

In Example 6, even if the amount ratio of terephthalic acid was high, a good powder of the prepolymer was obtained. Adhesion of the resin was not observed according to the adhesion test.

In contrast, in Comparative Example 1, although the polymerization was able to be proceeded by using NMI as a catalyst at a polymerization temperature higher than that of Example 1, color degradation was observed.

In addition, in Comparative Example 2, adhesion of the resin which was provided by polymerization using NMI as a catalyst at the same polymerization temperature as in Example 1, was observed according to the adhesion test. It can be considered that the solid phase polymerization had not been sufficiently proceeded under the reaction conditions of Comparative Example 2.

In Comparative Example 3, the melt polycondensation reaction was conducted without terephthalic acid in terms of confirmation. Polymerization was proceeded in the same melt polycondensation conditions (i.e., polymerization temperature and polymerization time) as in Comparative Example 2.

In Comparative Examples 4 and 5, if the polymerization temperature was out of a predetermined range, even when using catalytic amounts of DMAP, it was confirmed that the melt polycondensation did not proceed (see Comparative Example 4) or that it is difficult to obtain the desired product by the melt polycondensation (see Comparative Example 5).

From these results, the usefulness of the present invention was confirmed.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

The invention claimed is:

1. A method for manufacturing a liquid crystal polyester, comprising:
   (1) a step of adding a heterocyclic aromatic compound represented by the following formula (I) to a monomer mixture comprising a compound having a phenolic hydroxyl group and at least one monomer selected from the group consisting of terephthalic acid, a terephthalic acid derivative, 2,6-naphthalenedicarboxylic acid and a 2,6-naphthalenedicarboxylic acid derivative,
   (2) a step of conducting acylation of the phenolic hydroxyl group,
   (3) a step of further adding a heterocyclic aromatic compound represented by the following formula (I), and
   (4) a step of reacting the monomer mixture at a temperature of 240 to 300° C. so as to obtain a polymer, wherein
   the heterocyclic aromatic compound represented by the following formula (I) is added to the monomer mixture in amount of 0.001 to 1 parts by mass of the heterocyclic aromatic compound relative to 100 parts by mass of the monomer mixture, which is a total amount of the step (1) and the step (3),
   and, wherein
   formula (I) is:

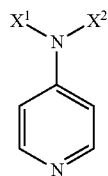

(I)

wherein each of $X^1$ and $X^2$ independently represents a methyl group, an ethyl group, a propyl group, a butyl group or a pentyl group, provided that one or more hydrogen atoms on a heterocyclic aromatic ring may each independently be replaced by a halogen atom, an alkyl group or an aryl group.

2. The method for manufacturing a liquid crystal polyester according to claim 1, further comprising:
   a cooling step comprising cooling the polymer obtained in the step (4);
   a milling step comprising milling the polymer which is solidified in the cooling step; and
   a solid phase polymerization step comprising heating the polymer which is milled in the milling step so as to increase the degree of polymerization by a solid phase polymerization higher than that of the polymer before the solid phase polymerization.

3. The method for manufacturing a liquid crystal polyester according to claim 1, wherein the monomer mixture comprises a compound represented by the following general formula (1'), a compound represented by the following general formula (2') and a compound represented by the following general formula (3')
   (1') $G^1$-O—$Ar^1$—CO-$G^2$
   (2') $G^2$-CO—$Ar^2$—CO-$G^2$
   (3') $G^1$-X—$Ar^3$—Y-$G^1$, wherein
   $Ar^1$ represents a phenylene group, a naphthylene group and a biphenylylene group;
   each of $Ar^2$ and $Ar^3$ independently represent a phenylene group, a naphthylene group, a biphenylylene group or a group represented by a general formula (4);
   each of X and Y independently represent an oxygen atom or an imino group;
   each of $G^1$ independently represents a hydrogen atom or an alkylcarbonyl group;
   each of $G^2$ independently represents a hydroxyl group, an alkoxy group, an aryloxy group, an alkylcarbonyloxy group or a halogen atom,
   provided that one or more hydrogen atoms in $Ar^1$, $Ar^2$ and $Ar^3$ may each independently be replaced by a halogen atom, an alkyl group or an aryl group, wherein the general formula (4) is:
   (4) —$Ar^4$—Z—$Ar^5$—,
   wherein, each of $Ar^4$ and $Ar^5$ independently represents a phenylene group or a naphthylene group; Z represents an oxygen atom, a sulfur atom, a carbonyl group, a sulfonyl group or an alkylidene group.

4. The method of manufacturing a liquid crystal polyester according to claim 1, wherein 1.00 to 1.15 equivalent of an acid anhydride is reacted with the phenolic hydroxyl group to acylate the phenolic hydroxyl group.

5. The method for manufacturing a liquid crystal polyester according to claim 4, wherein the acid anhydride is acetic anhydride.

* * * * *